United States Patent
Liebelt et al.

(10) Patent No.: US 9,747,066 B2
(45) Date of Patent: Aug. 29, 2017

(54) DYNAMIC WORKFLOW CONTROL BASED ON RECIPIENT PREFERENCES FOR DOCUMENTS

(71) Applicants: Linda Sue Liebelt, Boulder, CO (US); Michael Glen Lotz, Longmont, CO (US); Jennifer Skiendzielewski, Bouler, CO (US); Marquis G. Waller, Beverly, OH (US)

(72) Inventors: Linda Sue Liebelt, Boulder, CO (US); Michael Glen Lotz, Longmont, CO (US); Jennifer Skiendzielewski, Bouler, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/633,744

(22) Filed: Feb. 27, 2015

(65) Prior Publication Data

US 2016/0253140 A1  Sep. 1, 2016

(51) Int. Cl.
*G06F 15/00* (2006.01)
*G06F 3/12* (2006.01)

(52) U.S. Cl.
CPC .......... *G06F 3/1275* (2013.01); *G06F 3/1203* (2013.01); *G06F 3/1205* (2013.01); *G06F 3/1211* (2013.01); *G06F 3/1243* (2013.01); *G06F 3/1282* (2013.01)

(58) Field of Classification Search
None
See application file for complete search history.

(56) References Cited

U.S. PATENT DOCUMENTS

| | | |
|---|---|---|
| 6,891,635 B2 | 5/2005 | Dutta |
| 8,098,390 B1 | 1/2012 | Yacoub et al. |
| 8,130,951 B2 | 3/2012 | Tian |
| 8,368,931 B2 | 2/2013 | Tamura |
| 8,370,270 B2 | 2/2013 | Ray et al. |
| 8,869,023 B2 | 10/2014 | Berkner et al. |

(Continued)

FOREIGN PATENT DOCUMENTS

| | | |
|---|---|---|
| JP | 2001-296984 A | 10/2001 |
| JP | 2002-116894 A | 4/2002 |

(Continued)

OTHER PUBLICATIONS

European Search Report, EP16157117, Jul. 14, 2016.

*Primary Examiner* — Helen Q Zong
(74) *Attorney, Agent, or Firm* — Duft Bornsen & Fettig LLP (57) ABSTRACT

Systems and methods are provided for managing individual documents of a print job based on recipient preferences. One system is a workflow server that includes an interface able to receive print data defining a print job that includes documents that each indicate an intended recipient for delivery. The workflow server also includes a controller able to direct devices of a print shop in accordance with a workflow that comprises an ordered set of activities to perform upon the documents. The controller is further able to acquire preferences for the intended recipients, to correlate documents in the print job with the acquired preferences, and to alter processing of the correlated documents in the workflow, based on the preferences of the intended recipients.

20 Claims, 6 Drawing Sheets

(56) References Cited

U.S. PATENT DOCUMENTS

| | | | |
|---|---|---|---|
| 2003/0231328 | A1 | 12/2003 | Chapin et al. |
| 2005/0264832 | A1* | 12/2005 | Baum .................. G06F 3/1204 358/1.2 |
| 2011/0270688 | A1 | 11/2011 | Dew et al. |
| 2012/0147401 | A1 | 6/2012 | Poh et al. |
| 2012/0243028 | A1* | 9/2012 | Dumitrescu .......... G06F 3/1275 358/1.15 |
| 2013/0195381 | A1* | 8/2013 | Elliot .................... G06F 17/242 382/314 |
| 2013/0198300 | A1* | 8/2013 | Briggman ............... H04L 51/34 709/206 |
| 2013/0226695 | A1 | 8/2013 | Tamari |
| 2014/0029028 | A1* | 1/2014 | Fallon .................. G06F 3/1204 358/1.9 |
| 2014/0092435 | A1* | 4/2014 | Cudak .................... G06K 15/02 358/1.16 |
| 2014/0285848 | A1* | 9/2014 | Hoarau ............. G06Q 10/0635 358/1.15 |

FOREIGN PATENT DOCUMENTS

| | | |
|---|---|---|
| JP | 2009211699 | 9/2009 |
| JP | 2012181840 | 9/2012 |

\* cited by examiner

DATA EXTRACTED FROM PRINT JOB

| ACCOUNT | ZIP | TELEPHONE |
|---|---|---|
| 000001 | 90391 | 555-3044 |
| 000002 | 84812 | 555-6723 |
| 000003 | 57573 | 555-4821 |
| 000004 | 80807 | 555-0912 |
| 000005 | 12321 | 555-1111 |
| 000006 | 13234 | 555-4231 |
| 000007 | 54277 | 555-9178 |

410

PREFERENCES FILE 2

| EMAIL | ADVERTISING TAGS |
|---|---|
| jr@riverside | CATS, FISHING, DOGS |
| sue@lofts | SNOWBOARDING |
| hmroberts@net | FINANCING, RETIREMENT |
| colin@waterfront | HEALTH CARE |
| news@grid | ARTS & CRAFTS |
| lindsay@home | FURNITURE, RUGS, ART |
| snowbird@cabin | FINANCIAL HARDSHIP |

430

PREFERENCES FILE 1

| ACCOUNT | EMAIL | ONLINE DELIVERY? | QUARTERLY DELIVERY? | DELIVERY SERVICE |
|---|---|---|---|---|
| 000001 | jr@riverside | NO | YES | USPS |
| 000002 | sue@lofts | YES | NO | USPS |
| 000003 | hmroberts@net | YES | NO | USPS |
| 000004 | colin@waterfront | YES | YES | UPS |
| 000005 | news@grid | NO | YES | FEDEX |
| 000006 | lindsay@home | NO | YES | USPS |
| 000007 | snowbird@cabin | YES | YES | FEDEX |

LOAD PREFERENCES ACTIVITY

| FILE LOCATION |
| PROPERTY MAPPING OBJECT |
| FIELDS TO LOAD FROM FILE |
| MATCHING FIELD (ACCOUNT #) |

INSERT DOCUMENTS ACTIVITY

| SELECT INSERT PLAN MATCHING ADVERTISEMENT TAGS FOR RECIPIENT |
| INSERT STATEMENT INTO ENVELOPE ACCORDING TO INSERT PLAN |
| SELECT OUTPUT BIN BASED ON MAIL DELIVERY SERVICE PREFERRED BY RECIPIENT |

DYNAMIC WORKFLOW CONTROL BASED ON RECIPIENT PREFERENCES FOR DOCUMENTS

FIELD OF THE INVENTION

The invention relates to the field of print job management, and in particular, to workflow systems for a print shop.

BACKGROUND

Print shops are typically medium or large scale facilities capable of supplying printing services to meet a variety of customer demands. For example, print shops are often used to print documents for mass-mailing (e.g., bills, advertisements, etc.). Because print shops engage in printing on a scale that is hard to match, their customer base is usually varied. Print shop customers may therefore include both large institutional customers (e.g., credit card companies and banks), and small customers (e.g., small businesses and churches).

Print shops are generally arranged to print incoming jobs from customers in a way that is economical, yet fast. Thus, print shops often include a number of high-volume printers capable of printing incoming jobs quickly and at high quality. Print shops also typically include post-printing devices that process the printed documents of each job (e.g., stackers, staplers, cutters, binders, etc.). Print shops may also provide digital/web publishing, e-mail, or other multimedia services to customers. Because print shops serve a variety of customers, they are often tasked with processing jobs that have varying printing formats, delivery dates, and media requirements. Print shops therefore often use a centralized server that coordinates activity between printers and other devices of the print shop. However, print shop operators continue to desire enhanced servers capable of managing print jobs that have complex requirements.

SUMMARY

Embodiments described herein process a multi-document print job from a customer, based on a workflow that defines an ordered set of print shop activities to perform. The system alters how the workflow is performed for individual documents of the print job, based on the preferences of the recipients of those documents. This allows a print shop to dynamically alter its workflow for each document of the print job in order to handle the numerous and varying demands of the recipients.

One embodiment is a workflow server that includes an interface able to receive print data defining a print job that includes documents that each indicate an intended recipient for delivery. The workflow server also includes a controller able to direct devices of a print shop in accordance with a workflow that comprises an ordered set of activities to perform upon the documents. The controller is further able to acquire preferences for the intended recipients, to correlate documents in the print job with the acquired preferences, and to alter processing of the correlated documents in the workflow, based on the preferences of the intended recipients.

In a further embodiment the controller is able to identify default parameters for performing the activities, and to dynamically modify the parameters based on the preferences when processing the correlated documents.

In a further embodiment the controller is able to identify activities of the workflow to forego for the correlated documents, based on the preferences of the intended recipients.

In a further embodiment the workflow includes multiple branches that each define a different set of activities, and the controller is able to route the correlated documents of the print job along different branches of the workflow, based on the preferences of the intended recipients.

In a further embodiment the controller is able to alter processing of the correlated documents in the workflow after the controller initiates processing of the print job in accordance with the workflow.

In a further embodiment each document of the print job defines a separate piece of mail for delivery to an intended recipient.

In a further embodiment the controller is able to process an activity in the workflow that identifies a file sourced from an external server, and to analyze the activity to determine how to interpret the file to acquire the preferences.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
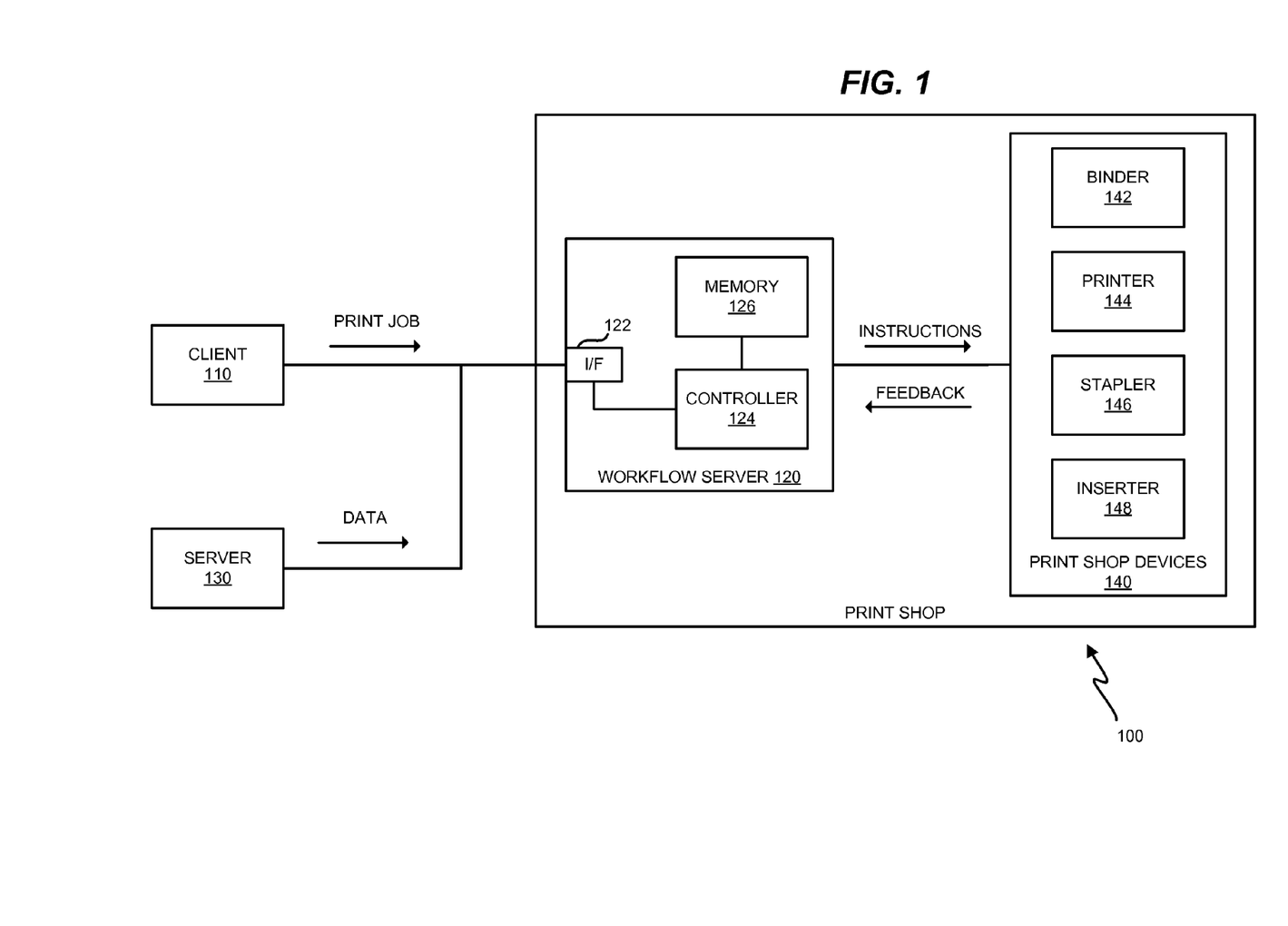
FIG. 1 is a block diagram of a workflow system in an exemplary embodiment.

FIG. 1 is a block diagram of a workflow system 100 in an exemplary embodiment. In workflow system 100, print data for an incoming job is received from client 110 at workflow server 120. Workflow server 120 reviews the incoming print job, and identifies a workflow for the print job. For example, in one embodiment workflow system 100 implements multiple "hot folders" that are each associated with a different workflow, and client 110 submits a print job to one of the hot folders at workflow server 120 in order to indicate a desired workflow. In a further embodiment, a combination of print job name and hot folder is used to identify a workflow for the print job. A workflow is an organized set of print shop activities to perform for the print job, such as printing, stapling, or binding. A workflow may be selected from pre-defined templates as desired. After a workflow has been chosen, workflow server 120 directs the devices of the print shop in accordance with the workflow to ensure that the print job is properly handled at the print shop.

Workflow system 100 has been enhanced to modify how individual documents of a print job are handled in a workflow, based on the preferences of the intended recipients of those documents. In this embodiment, workflow server 120 includes an interface (I/F) 122 (e.g., an Ethernet interface, wireless interface, etc.) for receiving print data for print jobs from client 110. Workflow server 120 further includes a controller 124 for managing print jobs received at workflow server 120, and a memory 126 (e.g., Random Access Memory (RAM), a hard disk, etc.) for storing print jobs from client 110. Controller 124 may be implemented as custom circuitry, a processor executing programmed instructions, etc.

Server 130 stores preference data that is relevant to an incoming print job. As used herein, preference data is data which is not a part of the print job itself (that is, preference data is not print data or a job ticket), and preference data describes information about recipients. In an embodiment where each print job includes hundreds of thousands of bank statements, server 130 may be an independent banking server that stores data for individual account holders. Server 130 comprises any system or component accessible to workflow server 120. In one embodiment, server 130 is external to the print shop. For example, server 130 may be physically separated from the print shop itself, or may be external to a network of the print shop and therefore only accessible via the Internet.

Print shop devices 140 include the devices and components of the print shop that perform the various activities described herein. For example, print shop devices 140 may include printers, post-printing machinery, e-mail or web publishing servers, etc. The print shop devices illustrated in FIG. 1 (binder 142, printer 144, stapler 146, and inserter 148) provide an example of the variety of print shop devices that may be utilized by a print shop. In this embodiment, binder 142 operates to bind printed pages into magazines or books, printer 144 operates to rasterize and print incoming print data onto physical pages, stapler 146 staples groups of pages together, and inserter 148 inserts physical pages into envelopes for delivery to recipients.

The particular arrangement, number, and configuration of components described herein is exemplary and non-limiting. Illustrative details of the operation of workflow system 100 will be discussed with regard to FIG. 2. Assume, for this embodiment, that client 110 has generated a print job for processing by the print shop, and has transmitted print data for the print job to workflow server 120.

Figure 2:
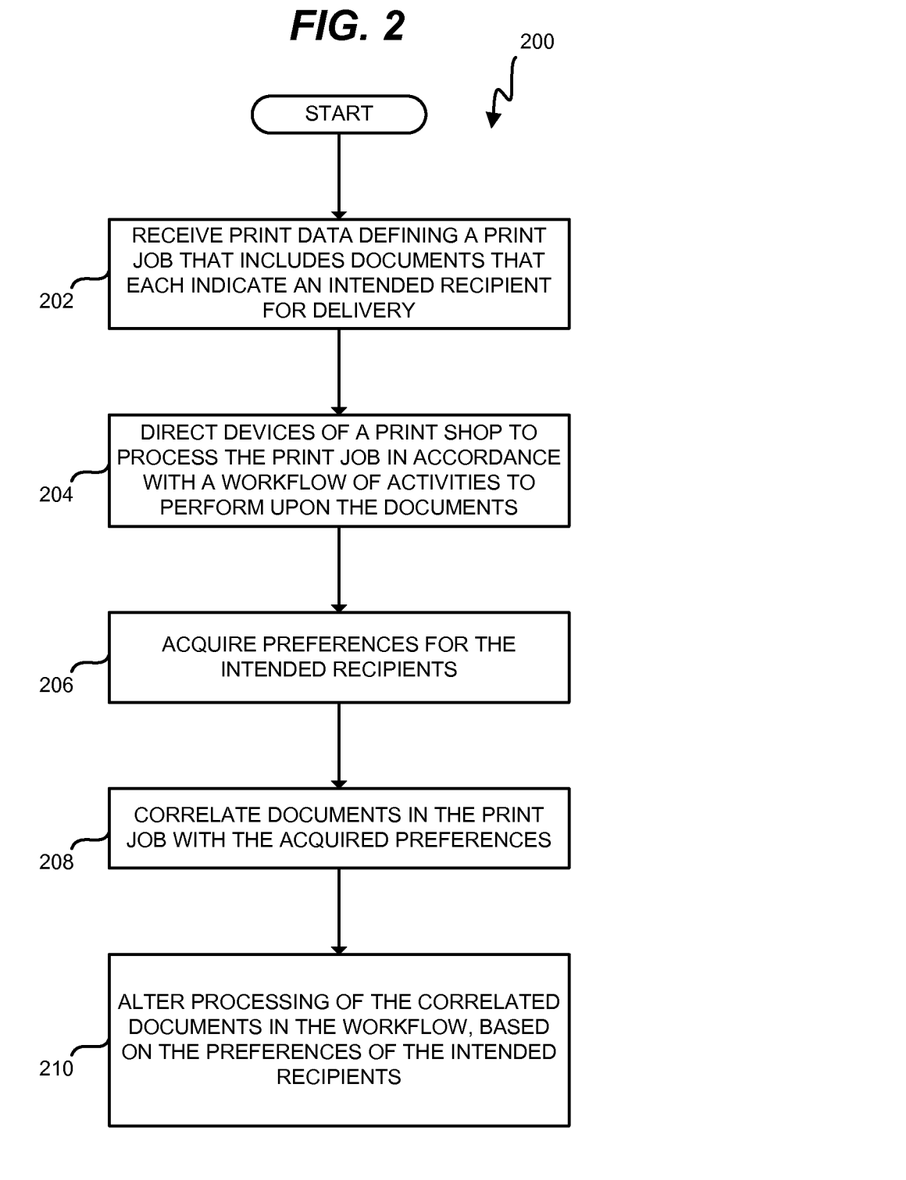
FIG. 2 is a flowchart illustrating a method for operating a workflow system in an exemplary embodiment.

FIG. 2 is a flowchart illustrating a method 200 for operating a workflow system in an exemplary embodiment. The steps of method 200 are described with reference to workflow system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, I/F 122 receives print data defining a print job that includes multiple documents from client 110. Each of the documents indicates an intended recipient for delivery. That is, a job ticket for the print job may identify a recipient for each document, or each document may include print data that identifies a recipient. As used herein, a "document" is an independent portion of a print job that is directed to a specific recipient for delivery (e.g., a single piece of mail). Alternatively, a document may be considered an independent portion of a print job that does not require other portions of the print job in order to maintain its whole context or meaning. For example, an individual chapter of a book is not a document, because the chapter needs to be read along with the other chapters of the book in order to be fully understood. In contrast, in a print job with thousands of bank statements where each bank statement is intended for delivery to a different account holder, each bank statement is a complete document in and of itself. The print data for the received print job may be formatted for example as an Advanced Function Presentation (AFP) datastream, or as Portable Document Format (PDF) print data accompanied by JDF job ticket instructions. Controller 124 may further analyze the print job to identify each document, as well as to determine information indicating the recipient of each document (e.g., account number, recipient name, telephone number, etc.).

After the print job has been received, controller 124 selects a workflow for the print job. For example, controller 124 may identify a file folder or interface through which the print job was received, and choose a workflow for the print job based on this information. The workflow defines an ordered set of print shop activities that are stored in memory (e.g., in memory 126). For example, the workflow may include configurable activities for directing a printer to print, or directing an inserter to insert documents into an envelope. When properly assembled and configured, the workflow comprises the digitally defined order of operations to perform at the print shop in order to handle a print job properly. That is, the activities defined in the workflow, when performed in order, enable workflow server 120 to manage the print shop devices and process the print job as desired. Each activity in a workflow may be associated with a category or type of print shop device (e.g., post-processing devices, printers, inserters) and may also be associated with specific named print shop devices. These activities may include printing or non-printing activities (e.g., billing, shipping, document review, multimedia/digital/internet activities, credit checks, etc.) as desired.

In step 204, controller 124 directs print shop devices 140 to process the print job in accordance with the workflow. Directing the individual print shop devices 140 may comprise identifying the current activity that has been reached in the workflow, sending instructions to the appropriate print shop device based on the current activity, awaiting feedback from the device indicating that processing has successfully completed for the workflow activity, and advancing the print job to the next workflow activity (as internally tracked by controller 124). Controller 124 may track the current activity on a document-by-document basis or may track the current activity for the entire print job as a whole.

In step 206, controller 124 acquires data that describes preferences for the intended recipients of the print job. For example, controller 124 may acquire the preferences from a file loaded onto workflow server 120 from server 130. In a further example, server 130 and server 120 may share a network-accessible file repository in which the preference data is stored. In yet another example, controller 124 may operate I/F 122 to contact server 130 and acquire preference data directly from server 130 (e.g., using an Internet Protocol address, user name, and password). Controller 124 may further store the retrieved preference data in memory 126 for later processing. The preferences may include any data describing the recipients that is not included in the print job. For example, preferences may indicate whether a recipient prefers monthly or quarterly delivery, may indicate what advertisements to send to the recipient, may indicate a recipient's desire for digital or mail delivery, etc.

In one embodiment, an activity in the workflow explicitly directs workflow server 120 to load the preferences. The workflow activity may include instructions for identifying server 130, and may further include parameters explaining how to interpret the file to acquire the preferences. For example, server 130 and workflow server 120 may both have access to a shared file system, and controller 124 may analyze the activity to load a preferences file within the shared file system. In one embodiment workflow server 120 transmits a request to download the preferences from server 130, in response to detecting the workflow activity. In one embodiment, the workflow activity is solely dedicated to loading external data, and does not include instructions for the print shop devices. In print jobs with millions of pages that take weeks to print, recipients may change their preferences as the print job is being printed. Thus, using one or more specific workflow activities to acquire preference data, while the print job is actively being processed in the workflow, provides a benefit in responsiveness that would not be achieved if the preference data were included in the initially generated print job.

In step 208, controller 124 correlates the documents with the preferences indicated in the preference data loaded from server 130. This step may comprise searching for matches between a field in the preference data, and data that has been previously mined from the print job for each document. For example, for each document (e.g., as represented in the mined data), controller 124 may compare an account number in the document against the preference data. If there is a match, then the entry in the preference data is correlated with the document.

In step 210, controller 124 alters processing of correlated documents in the workflow, based on the preferences. In an embodiment where the documents each comprise an individual piece of mail ("mail piece") directed to a different person, this change may alter the default parameters that define how a scheduled activity is performed for a given mail piece, based on the recipient preferences for that mail piece. Similarly, the change may influence whether or not workflow server 120 foregoes certain scheduled activities in the workflow for the mail piece, based on the recipient preferences for that mail piece. Furthermore, the workflow may branch along multiple paths that each comprise a set of different activities, and controller 124 may review the preferences correlated with each document to determine which branch of the workflow to route the document. In such embodiments, some documents of the print job may be routed along one branch, while other documents of the print job may be routed along another branch. In further embodiments, certain workflow activities (e.g., binding) may be skipped for certain recipients.

Method 200 provides a benefit over prior systems and techniques, because it allows for a workflow server to determine the preferences of recipients in order to modify how a workflow is applied to individual documents of a print job. This enhances the flexibility of the workflow in a manner that is both dynamic and beneficial. Furthermore, this reduces the amount of effort that a customer puts into initially preparing the print job, and increases the responsiveness of printing operations to changes in the preferences of individual recipients.

In a further embodiment, each customer of the print shop maintains a server with distinct preference data for recipients. A controller of the workflow server is configured to load preferences sourced from any of the multiple different servers when handling a print job, e.g., depending on the customer that originally submitted the print job. In another embodiment, one or more servers update workflow server 120 with new preferences on a regular basis.

In a further embodiment where the parameters for a workflow activity are altered by a preference of the recipient, the parameters for the workflow activity may include, for example, parameters for any of printing (e.g., quality, fonts used, page size), binding (e.g., type of binding applied, color of binding, etc.), delivery (e.g., postal carrier used to deliver the mail piece, speed of delivery selected, etc.), and others.

EXAMPLES

In the following examples, additional processes, systems, and methods are described in the context of a workflow system that prints and sorts account statements for mass-mailing to customers.

In this example, a workflow server operates on a computer of the print shop that is accessible via the Internet. The workflow server accesses print shop devices via an internal print shop intranet, to which a printer, e-mail server, and inserter of the print shop are connected. An incoming print job is received at the workflow server as a PDF print job that includes seven hundred thousand documents, which each correspond with a credit card statement for a different account holder. Each statement is a mail piece intended for delivery to a different recipient. A controller at the workflow server loads the print job into memory, and determines that the print job is a "statements" type of print job based on the name of the print job and a file folder of the workflow server where the print job was received. The controller then assigns a workflow to the print job based on the type of job.

Figure 3:
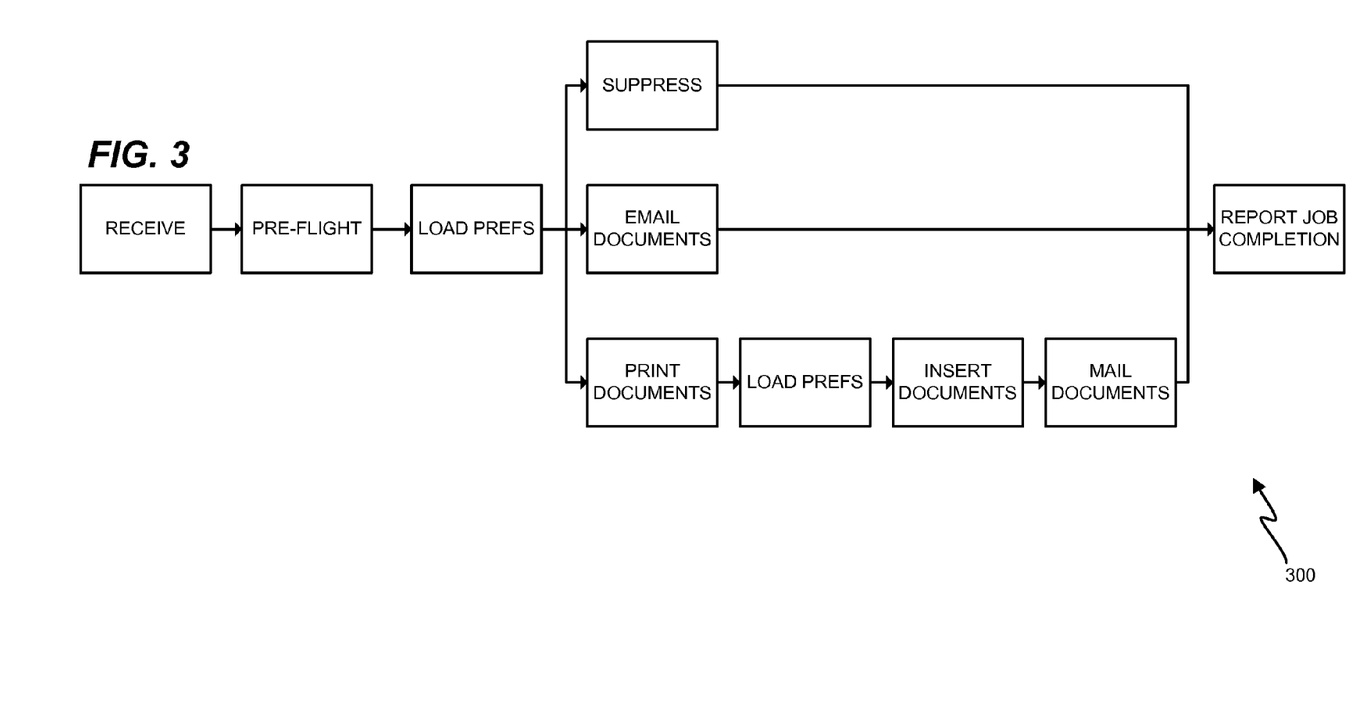
FIG. 3 is a block diagram illustrating a workflow in an exemplary embodiment.

FIG. 3 is a block diagram illustrating the workflow 300 assigned by the workflow server to the print job in this example. The workflow includes multiple configurable activities and three separate branching paths. A controller of the workflow server reviews the workflow, and completes a receive step when the print job has been successfully loaded into memory at the workflow server. During or after the receive step, the controller analyzes the PDF print data for the print job to identify each mail piece within the print job, and to extract an account number from each of the mail pieces. The controller then engages in a pre-flight step, where the controller reviews the print job to ensure that images within the print job are provided at an acceptable resolution, and that colors within the print job are specified correctly. The print shop operator reviews output from the controller during the pre-flight step, and either modifies the print job or notifies the workflow server (via a confirmation dialogue) that the print job is ready for further processing.

After the pre-flight operation has been completed, the controller reviews the next activity defined in the workflow, which is a first "load preferences" activity. This activity is located prior to printing in this example. This activity includes multiple parameters.

The first parameter indicates a file location for the preferences in a shared file repository of the workflow server. The file itself may be sourced from an external server (even one that did not originally create the print job), such as a web server for used by the company that manages the accounts. This information in the file may vary depending on the customer that created the print job. For example, a credit card company may use one file to store account holder preferences, while a bank may use an entirely separate file to store their own account holder preferences.

The second parameter indicates the location of a "property mapping object" that indicates how individual columns of preference data map to pieces of information found in individual documents. The controller consults the listed property mapping object to determine which columns in the preferences file correspond to document properties indicated in the print data itself (account number, name, etc.). The same property mapping object may remain on the workflow server unchanged, as long as data indicating recipient preferences does not change in number of columns (and/or the headings for the columns do not change).

In this example, when a mail piece has an account number that matches the preference data for an account holder, the mail piece is correlated with the preference data for that account holder. Once the mail pieces have been correlated with their corresponding recipient preferences, the controller dynamically assigns the mail pieces to different branches of the workflow shown in FIG. 3.

Figure 4:
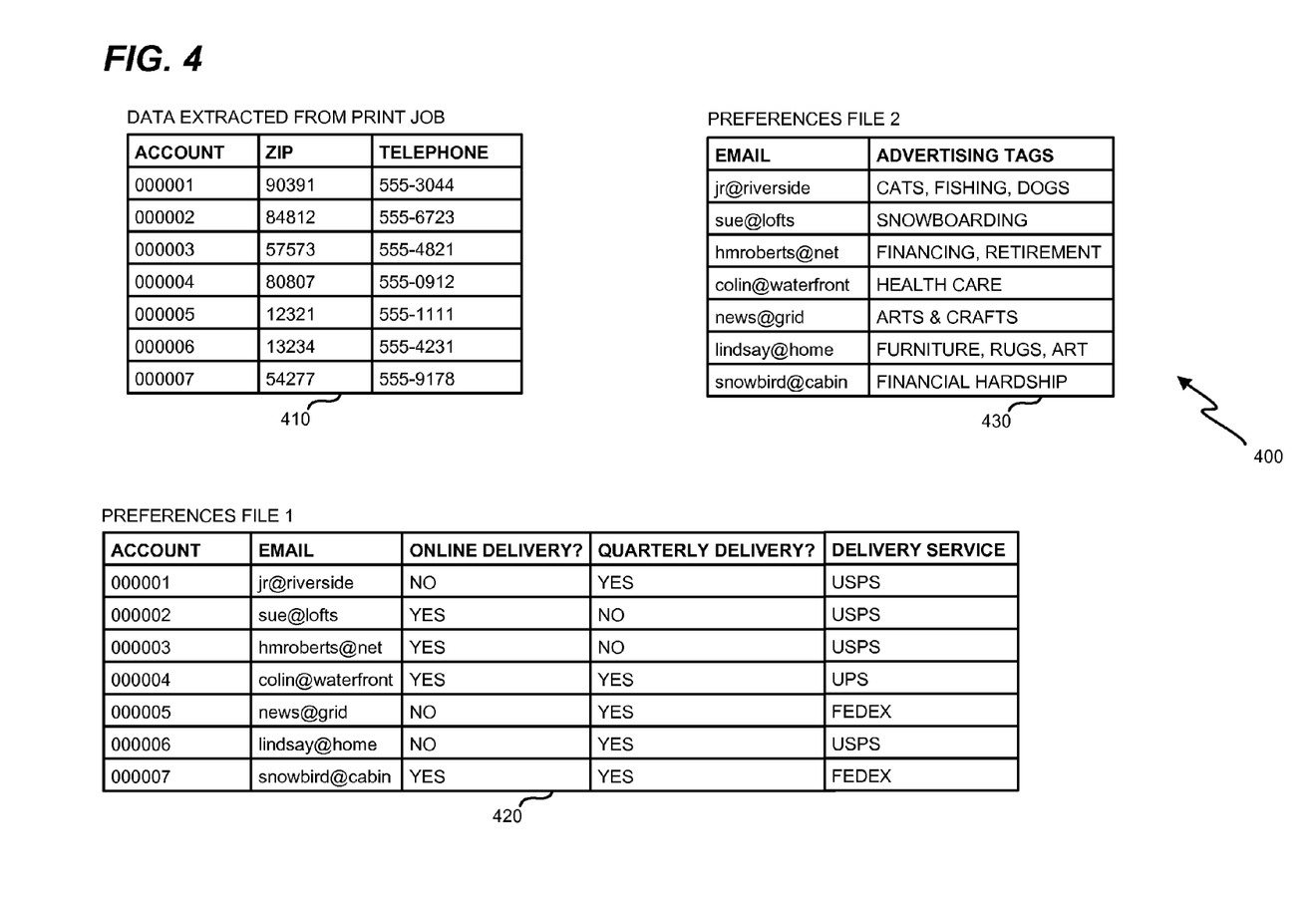
FIG. 4 is a block diagram illustrating various tables of data in an exemplary embodiment.

FIG. 4 is a block diagram 400 illustrating various tables of information in an exemplary embodiment. Table 410 illustrates data mined from the mail pieces of the initially received data, table 420 includes recipient preferences acquired in the first load preferences activity as described above, and table 430 includes recipient preferences acquired in a second load preferences activity (described below). The data includes, for example, fields for account number, zip code, email address, telephone number, whether the account holder prefers online delivery of their account statements, whether the account holder prefers quarterly delivery of statements instead of monthly, a list of advertising tags correlated with the account holder for that row, etc.

Once the first load preferences activity has been completed, the controller assigns a mail piece to a first branch (which includes the print activity), a second branch (which includes the email activity), or a third branch of the workflow (which includes an activity to suppress the mail piece entirely). The controller therefore reviews the preferences correlated with each mail piece, and identifies each mail piece that is correlated with an account holder who prefers online delivery. These mail pieces are extracted from the existing print job, are routed to the email documents activity, and are emailed as individual PDFs to account holders. The controller then identifies whether the remaining mail pieces are associated with quarterly delivery or not. Depending on the present date (i.e., whether the statement is being printed at the end of the quarter), mail pieces associated with quarterly delivery are suppressed.

The remaining mail pieces of the PDF print job are routed along the bottom workflow pathway. Along this pathway, the controller transmits the mail pieces to a printer for printing, and directs the printed documents to an inserter. The controller then loads preferences (e.g., as shown in table 420) provided by a second server, which indicates a list of advertising tags for the recipient of each mail piece. In this example, the second server is an independent advertising server that is unrelated to the entity that originally created the print job, and the controller correlates mail pieces with the new preferences based on email address. Having two activities for loading preferences in the workflow allows for "just in time" processing of mail pieces to occur, which can help to account for changes in recipient preferences as the print job (which may take weeks to process) moves through the workflow.

The controller further directs an inserter to add inserts to each mail piece. Each inserter includes a set of available inserts that are each associated with an advertising tag. The controller selects one or more inserts for each mail piece, based on the advertising tag for the recipient. The mail piece is then inserted into an envelope, along with its advertisements, and is mailed to its corresponding account holder. Once the mail pieces have traveled through their respective workflow paths, the controller sends a completion message to the customer that originally submitted the job, in order to indicate that the job has been successfully completed.

Figure 5:
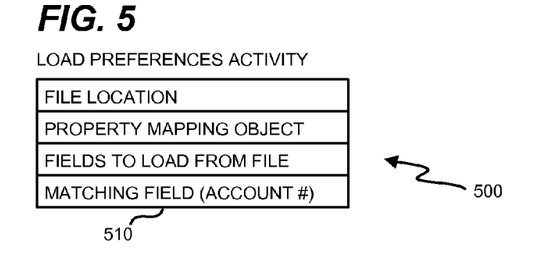
FIG. 5 is a block diagram illustrating a workflow activity for loading recipient preferences in an exemplary embodiment.

FIG. 5 is a block diagram 500 illustrating a workflow activity 510 for loading preferences in an exemplary embodiment. In this example, workflows are stored in a data base at the workflow server as a set of steps and job properties/parameters to be used by each step for processing (e.g., duplex, output location, etc.). The workflow activity 510 is defined in memory at the workflow server to include information describing a file location for the preference data, a property mapping object that includes translation parameters for interpreting the file, a list of fields to load from the file for each entry of the file, and a matching field. The matching field indicates which field of the external data should be compared to documents of the print job in order to correlate each document with an entry.

Figure 6:
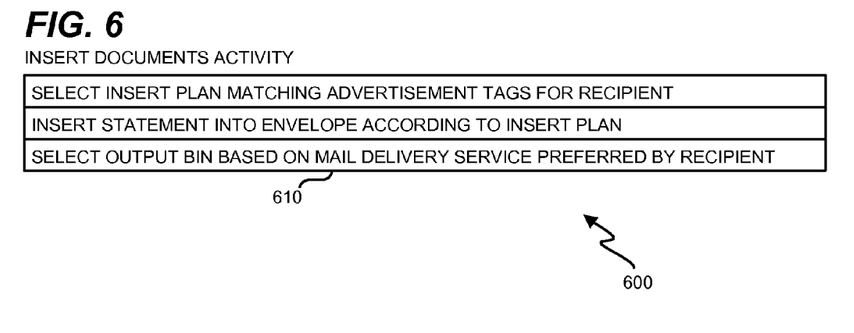
FIG. 6 is a block diagram illustrating a workflow activity that is altered based on loaded preferences for a print job in an exemplary embodiment.

FIG. 6 is a block diagram 600 illustrating a workflow activity 610 that is altered based on loaded preference data for a print job in an exemplary embodiment. In this example, the workflow activity itself, as stored in memory at the workflow server, includes parameters that change the way a print job is processed, based on data that is external to the print shop. Specifically, the "insert documents" activity includes instructions to select inserts to include with a mail piece (e.g., an advertisement) based on advertising tags associated with the recipient. The activity also includes instructions/parameters to select an output bin for the mail piece at the inserter. In this example, each output bin of the inserter is associated with a different mail delivery service (e.g., FedEx, UPS, the U.S. Postal Service, etc.), and the output bin for the mail piece is selected based on the recipient's preferred delivery service.

Figure 7:
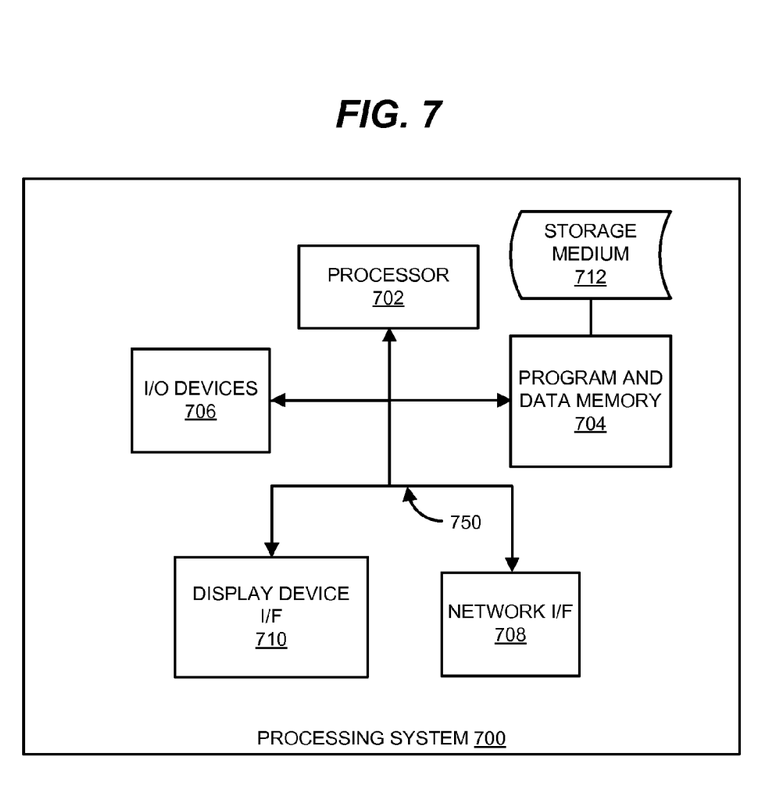
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of workflow server 120 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

We claim:

1. A workflow server comprising:
an interface configured to receive print data defining a print job that includes documents that each comprise a mail piece having an intended recipient for delivery, wherein there are multiple recipients indicated by the documents of the print job; and
a controller configured to direct devices of a print shop in accordance with a workflow that comprises an ordered set of activities to perform upon the documents, and the activities comprise operations performed by a printer or post-printing device for physically printed versions of the documents;
wherein the controller is configured to acquire preferences for the intended recipients, to correlate documents in the print job with the acquired preferences, and to alter processing of the correlated documents in the workflow by selectively skipping activities in the workflow for the correlated documents, based on the preferences of the intended recipients.

2. The workflow server of claim 1 wherein:
the controller is configured to identify default parameters for performing the activities, and to dynamically modify the parameters based on the preferences when processing the correlated documents.

3. The workflow server of claim 1 wherein:
the controller is configured to identify activities of the workflow to forego for the correlated documents, based on the preferences of the intended recipients.

4. The workflow server of claim 1 wherein:
the workflow includes multiple branches that each define a different set of activities, and
the controller is configured to alter the processing of the correlated documents by changing the branch through which the correlated documents of the print job are routed, based on the preferences of the intended recipients.

5. The workflow server of claim 1 wherein:
the controller is configured to alter processing of the correlated documents in the workflow after the controller initiates processing of the print job in accordance with the workflow.

6. The workflow server of claim 1 wherein:
each document of the print job defines a separate piece of mail for delivery to an intended recipient.

7. The workflow server of claim 1 wherein:
the controller is configured to process an activity in the workflow that identifies a file sourced from an external server, and to analyze the activity to determine how to interpret the file to acquire the preferences.

8. A method comprising:
receiving print data defining a print job that includes documents that each comprise a mail piece having an intended recipient for delivery, wherein there are multiple recipients indicated by the documents of the print job;
directing devices of a print shop to process the print job in accordance with a workflow that comprises an ordered set of activities to perform upon the documents, and the activities comprise operations performed by a printer or post-printing device for physically printed versions of the documents;
acquiring preferences for the intended recipients;
correlating documents in the print job with the acquired preferences; and
altering processing of the correlated documents in the workflow by selectively skipping activities in the workflow for the correlated documents, based on the preferences of the intended recipients.

9. The method of claim 8 further comprising:
identifying default parameters for performing the activities; and
dynamically modifying the parameters based on the preferences when processing the correlated documents.

10. The method of claim 8 further comprising:
identifying activities of the workflow to forego for the correlated documents, based on the preferences of the intended recipients.

11. The method of claim 8 wherein:
the workflow includes multiple branches that each define a different set of activities, and the method further comprises altering the processing of the correlated documents by changing the branch through which the correlated documents of the print job are routed based on the preferences of the intended recipients.

12. The method of claim 8 wherein:
altering processing of the correlated documents in the workflow after the controller initiates processing of the print job in accordance with the workflow.

13. The method of claim 8 wherein:
each document of the print job defines a separate piece of mail for delivery to an intended recipient.

14. The method of claim 8 further comprising:
processing an activity in the workflow that identifies a file sourced from an external server; and
analyzing the activity to determine how to interpret the file to acquire the preferences.

15. A non-transitory computer readable medium embodying programmed instructions which, when executed by a processor, are operable for performing a method comprising:
receiving print data defining a print job that includes documents that each comprise a mail piece having an intended recipient for delivery, wherein there are multiple recipients indicated by the documents of the print job;
directing devices of a print shop to process the print job in accordance with a workflow that comprises an ordered set of activities to perform upon the documents, and the activities comprise operations performed by a printer or post-printing device for physically printed versions of the documents;
acquiring preferences for the intended recipients;
correlating documents in the print job with the acquired preferences; and
altering processing of the correlated documents in the workflow by selectively skipping activities in the workflow for the correlated documents, based on the preferences of the intended recipients.

16. The medium of claim 15 the method further comprising:
identifying default parameters for performing the activities; and
dynamically modifying the parameters based on the preferences when processing the correlated documents.

17. The medium of claim 15 the method further comprising:
identifying activities of the workflow to forego for the correlated documents, based on the preferences of the intended recipients.

18. The medium of claim 15 wherein:
the workflow includes multiple branches that each define a different set of activities, and the method further comprises altering the processing of the correlated documents by changing the branch through which the correlated documents of the print job are routed, based on the preferences of the intended recipients.

19. The medium of claim 15 wherein:
alter processing of the correlated documents in the workflow after the controller initiates processing of the print job in accordance with the workflow.

20. The medium of claim 15 wherein:
each document of the print job defines a separate piece of mail for delivery to an intended recipient.

* * * * *